United States Patent [19]
Lu et al.

[11] Patent Number: 5,397,183
[45] Date of Patent: Mar. 14, 1995

[54] ACTIVE BEARING

[75] Inventors: Leo K. Lu, Saratoga; Robert P. Andrews, San Jose; Kenneth J. Bussell, Milpitas, all of Calif.

[73] Assignee: Westinghouse Electric Corporation, Pittsburgh, Pa.

[21] Appl. No.: 96,236

[22] Filed: Jul. 26, 1993

[51] Int. Cl.6 ............ F16C 32/00; F16C 23/00
[52] U.S. Cl. ............... 384/1; 384/100; 384/247; 384/312; 384/448
[58] Field of Search ......... 384/1, 99, 100, 103, 384/106, 114, 129, 247, 252, 253, 261, 302, 309–312, 448, 490, 456, 517, 535, 548, 581, 627

[56] References Cited

U.S. PATENT DOCUMENTS

| | | | |
|---|---|---|---|
| 4,643,592 | 2/1987 | Lewis et al. | 384/100 |
| 4,767,223 | 8/1988 | Goodwin | 384/100 X |
| 4,850,719 | 7/1989 | Moseley et al. | 384/1 |
| 5,221,146 | 6/1993 | Maruyama | 384/448 X |
| 5,238,308 | 8/1993 | Lang et al. | 384/1 |

FOREIGN PATENT DOCUMENTS

| | | | |
|---|---|---|---|
| 2236015 | 9/1990 | Japan | 384/1 |
| 149412 | 6/1991 | Japan | 384/252 |

*Primary Examiner*—Thomas R. Hannon

[57] ABSTRACT

A mechanical bearing, the major advantage inherent in magnetic and other non-contact bearing designs, i.e., being active. The specific bearing disclosed is a tilt pad bearing having a structure which changes shape in a controlled manner in response to a control signal, which structure is made up of a piezoceramic smart material and a backing housing. A controller is also provided for developing a control signal in response to feedback information.

13 Claims, 1 Drawing Sheet

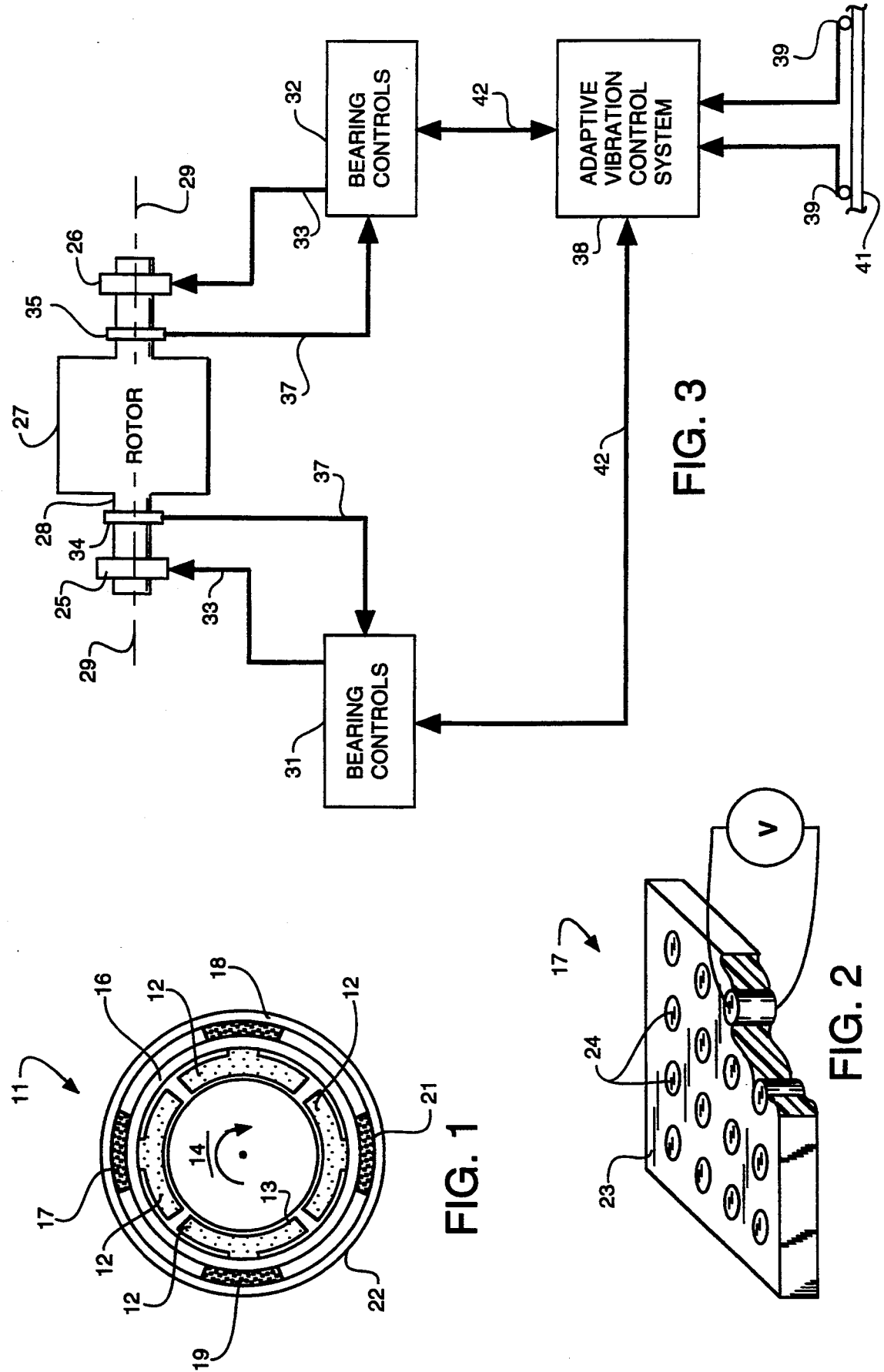

ACTIVE BEARING

BACKGROUND OF THE INVENTION

The present invention relates to bearings and, more particularly, to an active mechanical bearing for an axially rotatable member.

Mechanical bearings have been designed and used for many centuries to support shafts or other axially rotatable members. The design of a mechanical bearing typically makes the same quite reliable and rugged. Mechanical bearings are generally classified as journal, ball or roller bearings. Journal bearings are subclassified as standard journal, tilt pad and compliant.

A major problem with many mechanical bearings is that they are dirty in the sense that they often require an oil or other lubricant to be in contact with the rotating part. In this connection, many mechanical bearings are oil film bearings. That is, even though the mechanical bearing may have what is referred to as a bearing surface, the actual substance which is in contact with the rotatable member is an oil film which is formed between such bearing surface and the rotatable member. Another problem with most mechanical bearings is that they are passive, i.e., the amount and type of support such a bearing provides to a rotatable member cannot be controllably changed during the bearing function. That is, the support provided by such a bearing is fixed and cannot be changed in real time to take potential feedback or other information into consideration.

Non-contact bearings, such as magnetic bearings, are sometimes used because of these problems. A magnetic bearing provides the bearing function by suspending a rotating part relative to a supporting structure with a magnetic field. While magnetic bearings are conducive to feedback because the field, and, hence, the bearing support can be changed, a magnetic bearing design typically is quite expensive compared to the cost of a similar mechanical bearing. Moreover, magnetic bearings often require back-up with a conventional mechanical bearing to prevent a failure from having catastrophic results.

SUMMARY OF THE INVENTION

The present invention is an active bearing which brings the advantages of non-contact magnetic bearings to mechanical bearing designs. It is particularly useful to inhibit rotating part vibration and consequent noise. In its basic aspects, the active bearing of the invention includes a mechanical bearing element providing a bearing surface for an axially rotatable member and, in keeping with the invention, a structure supporting the bearing surface which will change shape in a controlled manner in response to a control signal. A controller is also provided for developing the control signal.

Most desirably, a sensor is provided to enable feedback, i.e., the shape change control signal is developed based on the measured changes that are required to obtain the desired action. For example, if the desired action is to minimize vibration, then the sensor measures translational movement of the rotating member orthogonal to the axis of rotation and instructs the controller to develop a control signal to minimize such translational motion. A reaction sensor is also included to apply a signal to the controller to indicate a reaction of a selected part to the control and change the control signal to obtain a desired reaction.

Other features and advantages of the invention either will become apparent or will be described in connection with the following, more detailed description of a preferred embodiment of the invention.

BRIEF DESCRIPTION OF THE DRAWINGS

With reference to the accompanying drawing:

FIG. 1 is a preferred embodiment of an active bearing of the invention;

FIG. 2 is a partially broken away and schematic view of a piezoceramic material which is incorporated into the preferred embodiment of FIG. 1; and FIG. 3 is an active bearing system incorporating the invention.

DETAILED DESCRIPTION OF A PREFERRED EMBODIMENT

The following relatively detailed description is provided to satisfy the patent statutes. However, it will be appreciated by those skilled in the art that various changes and modifications can be made without departing from the invention.

An active bearing of the invention is generally referred to in FIG. 1 by the reference numeral 11. Such bearing is, in essence, a tilt pad journal bearing, a type of mechanical bearing. It will be recognized by those skilled in the art, though, that the invention is applicable to other types of mechanical bearings, e.g., other journal type bearings, ball or roller bearings. Bearing 11 includes a plurality (in this case four) of pads 12, each of which has a bearing surface 13 which is opposed to a shaft or other axially rotatable member 14. In accordance with conventional practice, the pads 12 project for rocking movement from a housing 16 which supports the same. The material of the pads 12 is subjected to static compressive loading in addition to dynamic alternating deformation. This has to be taken into account in accordance with conventional criteria in selecting materials for specific purposes.

As described to this point, bearing 11 is a generally conventional oil film bearing. Oil is drawn in to the tilt pad bearing surfaces 13 by the rotation of shaft 14, and provides a film between such surfaces 13 and the shaft. The housing 16 acts to prevent escape of the oil.

In keeping with the invention, a plurality of pads 17, 18, 19 and 21 of a smart material, i.e., a material which will respond to a control signal by changing shape, are sandwiched between housing 16 and a backing housing 22. Housing 16 is an inner housing with the invention and backing housing 22 is a tubular outer housing for the bearing and acts as an interface with the bearing support structure (not shown). In this design, the smart material pads preferably are located circumferentially at the points at which the tilt pads 12 transmit any force on the same to inner housing 16. It will be recognized that the number and location of the smart material pads in any particular design will depend on various factors relating to such design.

FIG. 2 illustrates a preferred piezoceramic smart material pad. As illustrated, it is made up of a columnar sheet 23 supporting a plurality of cylindrical piezoceramic elements 24. The elements 24 will respond to an electrical control signal by changing shape in a controlled manner, i.e., controlled by the nature of the signal.

It should be noted that although the smart material which is described is a piezoceramic one, other types, such as magnetostrictive materials, also can be used with the invention. The nature of the control signal will depend on the material selected and the bearing design. It is contemplated, for example, that in some instances it may be preferable that a magnetic field be used to provide control, and the control signal be the magnetic component of an electromagnetic signal. The ability of any selected smart material to deform may impose some limitation on the range of application. The invention is ideal for noise reduction of precision machinery where accelerations of rotating parts are small and large displacement control by the bearings is not required.

It will be seen from the above that the backing housing cooperates with the smart material pads to provide a structure which will change shape in a controlled manner in response to a control signal. The backing housing shape is relatively stable and it will direct the change in the smart material to the inner housing 16. In this connection, such inner housing 16 is a tubular shell of an impermeable material which circumscribes the mechanical bearing and separates the same from the piezoceramic material pads 17-21 to protect the latter from oil or other contamination provided by the mechanical aspect of the bearing. Also, the placing of the smart material pads outside of the housing 16 avoids the complex mechanics of lubrication of the same which would be caused by the active deformation of such pads.

Reference is made to FIG. 3 for a fuller explanation of the bearing. The active bearing design illustrated in FIG. 1 is represented in FIG. 3 at 25 and 26. A rotor 27 which rotates about an axis represented at 29 has end shafts 28 which pass through such bearings. (Although not illustrated, it will be appreciated that the bearings 25 and 26 are supported to be stationary relative to such rotation.) Controllers 31 and 32 are connected to the smart material of each of the bearings 25 and 26, respectively, as schematically represented by lines 33. Each of the controllers develops a control signal to change the shape as desired in its associated bearing.

The control signal is developed to deform the respective deformable structures in the amount of, and in phase with, displacement of housing 16. The result is that there is no force transmission from the rotor to the structure supporting the bearings. The active bearing of the invention acts similar to the notch filter typically found in magnetic bearing arrangements.

The control signal developed by each of the controllers is based on feedback from the rotating shaft. In this connection, position sensors 34 and 35 circumscribe the shafts 28 respectively adjacent the bearings 25 and 26 as illustrated. Each of the sensors senses translational movement of the shafts in a plane (not shown) orthogonal to the rotational axis 29, and means represented at 37 directs a signal defining the translational movement to the controller. This feedback signal is used via closed-loop control to tailor the control signal provided by the controllers 31 and 32.

A reaction sensor represented by the adaptive vibration control system 38 is also included. In this connection, the particular use for which the specific implementation of the invention is designed, is to control vibration of a structure. The reaction sensor 38 includes multiple vibration pick-up devices 39 mounted on a structure 41 whose vibration is to be canceled. Such reaction sensor feeds and receives signals, as is represented by the lines 42, to the controllers 31 and 32 for use also in tailoring the control signal.

It will be seen from the above that the bearing of the invention brings to the mechanical bearing art, the major advantage inherent in magnetic and other non-contact bearing designs, i.e., being active. As mentioned previously, the specific embodiment is exemplary, rather than exhaustive. The claims, their equivalents and their equivalent language define the scope of protection.

What we claim is:

1. An active bearing for an axially rotatable member, comprising:
    a) a mechanical bearing for said member having at least one means providing a bearing surface for said axially rotatable member;
    b) a structure supporting said means, which structure will change shape in a controlled manner in response to a control signal;
    c) a controller for developing said control signal for application to said structure;
    d) a reaction sensor for measuring a reaction outside said bearing to a shape change in said structure; and
    e) means for directing a signal defining said measurement to said controller for use by the latter to tailor a control signal.

2. The active bearing of claim 1 wherein said mechanical bearing is selected from the group consisting of journal bearings, ball bearings, and roller bearings.

3. The active bearing of claim 2 wherein said mechanical bearing is a tilt pad journal bearing.

4. The active bearing of claim 3 further including a separator as part of said combination separating said structure from said mechanical bearing and said axially rotatable member.

5. The active bearing of claim 1 further including a separator as part of said combination separating said structure from said mechanical bearing and said axially rotatable member.

6. The active bearing of claim 5 wherein said structure includes both a backing whose shape is relatively stable and a piezoceramic material connected to said backing which will respond to a control signal by changing shape.

7. The active bearing of claim 6 further including as part of said combination, a sensor for sensing translational movement for said rotatable member having a component in a plane orthogonal to its axis of rotation, and means for directing a signal defining said translational movement to said controller.

8. The active bearing of claim 6 wherein said backing is a tubular outer housing for said active bearing.

9. The active bearing of claim 5 wherein said separator includes a shell of an impermeable material circumscribing said mechanical bearing and said axially rotatable member.

10. The active bearing of claim 9 wherein said shell is tubular.

11. The active bearing of claim 1 further including as part of said combination, a sensor for sensing any translational movement of said rotatable member having a component in a plane orthogonal to its axis of rotation, and means for directing a control signal defining said translational movement to said controller.

12. The active bearing of claim 1 wherein said reaction sensor is an adaptive vibration control system which measures the vibration caused by rotation of said rotatable member, said means for directing a signal defining said measurement to said controller for use by the latter to tailor said control signal.

13. An active bearing for an axially rotatable shaft comprising:
   a) a mechanical bearing selected from the group consisting of journal bearings, ball, and roller bearings, providing a bearing surface for said shaft;
   b) a structure supporting said mechanical bearing, which structure includes:
      i) a piezoceramic which will respond to a control signal by changing shape in a controlled manner; and
      ii) a backing whose shape is relatively stable;
   c) means separating said structure from said mechanical bearing and said axially rotatable member;
   d) a sensor for sensing translational movement for said rotatable member having a component in a plane orthogonal to its axis of rotation;
   e) means for directing a signal defining said translational movement to said controller for use by the latter to tailor said control signal;
   f) a reaction sensor for measuring a reaction outside said bearing to a shape change by said piezoceramic; and
   g) means for directing a signal defining said measurement also to said controller for use by the latter to tailor said control signal.

* * * * *